(12) United States Patent
Haddad

(10) Patent No.: US 8,811,329 B2
(45) Date of Patent: *Aug. 19, 2014

(54) SYSTEM AND METHOD FOR MOBILITY WITH A SPLIT HOME AGENT ARCHITECTURE USING MPTCP

(71) Applicant: Telefonaktiebolaget L M Ericsson (Publ), Stockholm (SE)

(72) Inventor: Wassim Haddad, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,979

(22) Filed: Mar. 20, 2013

(65) Prior Publication Data

US 2013/0223407 A1    Aug. 29, 2013

Related U.S. Application Data

(63) Continuation of application No. 12/969,229, filed on Dec. 15, 2010, now Pat. No. 8,428,024.

(60) Provisional application No. 61/366,314, filed on Jul. 21, 2010.

(51) Int. Cl.

| | |
|---|---|
| H04W 28/16 | (2009.01) |
| H04W 40/12 | (2009.01) |
| H04W 40/34 | (2009.01) |
| H04W 4/00 | (2009.01) |
| H04W 36/30 | (2009.01) |
| H04L 29/06 | (2006.01) |
| H04W 8/06 | (2009.01) |
| H04W 8/12 | (2009.01) |
| H04W 76/02 | (2009.01) |
| H04W 36/00 | (2009.01) |
| H04W 76/04 | (2009.01) |
| H04W 80/06 | (2009.01) |
| H04W 28/04 | (2009.01) |
| H04W 8/08 | (2009.01) |
| H04W 8/26 | (2009.01) |
| H04W 88/14 | (2009.01) |
| H04W 28/18 | (2009.01) |
| H04W 48/08 | (2009.01) |
| H04W 80/04 | (2009.01) |

(52) U.S. Cl.
CPC ............... *H04W 36/30* (2013.01); *H04W 8/12* (2013.01); *H04W 76/022* (2013.01); *H04W 36/0033* (2013.01); *H04W 76/041* (2013.01); *H04W 80/06* (2013.01); *H04L 29/06* (2013.01); *H04W 28/04* (2013.01); *H04W 8/082* (2013.01); *H04W 8/26* (2013.01); *H04W 8/065* (2013.01); *H04W 88/14* (2013.01); *H04L 69/14* (2013.01); *H04W 28/18* (2013.01); *H04W 48/08* (2013.01); *H04W 80/04* (2013.01)
USPC .............. 370/329; 455/432.1; 455/452.2; 709/228; 709/239

(58) Field of Classification Search
USPC .......... 370/237, 328, 329, 331, 332; 455/440, 455/445, 452.2, 432.1, 435.1, 436, 443, 455/452.1; 709/228, 239
See application file for complete search history.

(56) References Cited

U.S. PATENT DOCUMENTS

| | | | |
|---|---|---|---|
| 6,549,522 B1 | 4/2003 | Flynn | |
| 6,973,057 B1 | 12/2005 | Forsloew | |
| 7,039,404 B2 * | 5/2006 | Das et al. ................... | 455/435.1 |
| 7,333,482 B2 * | 2/2008 | Johansson et al. ............ | 370/353 |
| 7,366,147 B2 * | 4/2008 | O'Neill ........................ | 370/338 |
| 7,519,738 B2 | 4/2009 | Forsberg | |
| 7,610,393 B1 * | 10/2009 | Chen et al. ................... | 709/230 |
| 7,764,640 B2 * | 7/2010 | Lee et al. ...................... | 370/328 |
| 7,813,343 B2 * | 10/2010 | Westphal et al. ............. | 370/389 |
| 7,840,217 B2 | 11/2010 | Patel et al. | |
| 7,843,880 B2 * | 11/2010 | Ng et al. ........................ | 370/331 |
| 7,869,435 B2 * | 1/2011 | Seguchi et al. ............... | 370/392 |
| 8,040,845 B2 | 10/2011 | Oulai et al. | |
| 8,077,695 B2 | 12/2011 | O'Neill | |
| 8,125,954 B2 | 2/2012 | Wu | |
| 8,165,290 B2 | 4/2012 | Gundavelli et al. | |
| 8,230,076 B2 | 7/2012 | Weniger et al. | |

| | | | |
|---|---|---|---|
| 8,347,077 B2 | 1/2013 | Yegani et al. | |
| 8,428,024 B2 * | 4/2013 | Haddad | 370/329 |
| 8,699,433 B2 * | 4/2014 | Haddad | 370/329 |
| 2004/0004967 A1 * | 1/2004 | Nakatsugawa et al. | 370/400 |
| 2004/0098507 A1 * | 5/2004 | Thubert et al. | 709/245 |
| 2004/0176095 A1 * | 9/2004 | Yamada et al. | 455/445 |
| 2005/0286504 A1 * | 12/2005 | Kwon | 370/356 |
| 2006/0146748 A1 * | 7/2006 | Ng et al. | 370/331 |
| 2007/0165559 A1 * | 7/2007 | Seguchi et al. | 370/328 |
| 2009/0080387 A1 * | 3/2009 | Dell'Uomo et al. | 370/338 |
| 2009/0201855 A1 | 8/2009 | Weniger et al. | |
| 2009/0213797 A1 | 8/2009 | Li | |
| 2009/0262685 A1 | 10/2009 | Schuringa et al. | |
| 2010/0226313 A1 | 9/2010 | Sugimoto et al. | |
| 2010/0272062 A1 | 10/2010 | Velev et al. | |
| 2011/0252151 A1 | 10/2011 | Lu et al. | |
| 2012/0023211 A1 | 1/2012 | Haddad | |
| 2012/0057502 A1 * | 3/2012 | O'Neill | 370/254 |

FOREIGN PATENT DOCUMENTS

EP  2129056  12/2009

OTHER PUBLICATIONS

Wakiawa R. et al.: "*Inter Home Agents Protocol (HAHA)*"; Internet Citation, Feb. 16, 2004, p. 8, paragraph 3; http://www.mobilenetworks.org/nemo/drafts/draft-wakikawa-mip6-memo-ha_ha-01,txt.

3GPP: "*3rd Generation Partnership Project; Technical Specification Group Services and System Aspects; 3GPP system to Wireless Local Area Network...*" vol. SA WG2; Nov. 19, 2002; 11 pages.

Aura, T., , "Cryptographically Generated Addresses (CGA)", *Network Working Group; Request for Comments: 3972; Category: Standards Track*, 22.

Johnson, D., , et al., "Mobility Support in IPv6", *Network Working Group; Request for Comments: 3775; Category Standards Track*, Jun. 1, 2004, 165.

Notice of Allowance, U.S. Appl. No. 12/969,229, dated Dec. 21, 2012, 15 pages.

Notice of Allowance, U.S. Appl. No. 12/969,235, dated Sep. 4, 2013, 15 pages.

\* cited by examiner

*Primary Examiner* — Ahmed Elallam

(74) *Attorney, Agent, or Firm* — Blakey, Sokoloff, Taylor & Zafman, LLP

(57) ABSTRACT

A method is implemented in a network element functioning as a control node for a mobile node (MN) communicating with a corresponding node (CN). The method includes selecting a virtual agent in the network to provide mobility services to the MN. The virtual agent represents a set of mobile resources proximate to the MN. The virtual agent is selected such that the MN receives a better quality of service when communicating with the CN through the virtual agent. A provisioning message is sent to the selected virtual agent including parameters for a session between the MN and CN. The provisioning message initiates a flow redirection at the virtual agent. A provisioning acknowledgement message is received from the virtual agent indicating that the virtual agent is receiving data packets from the CN and forwarding the data packets to the MN at the care-of address.

12 Claims, 6 Drawing Sheets

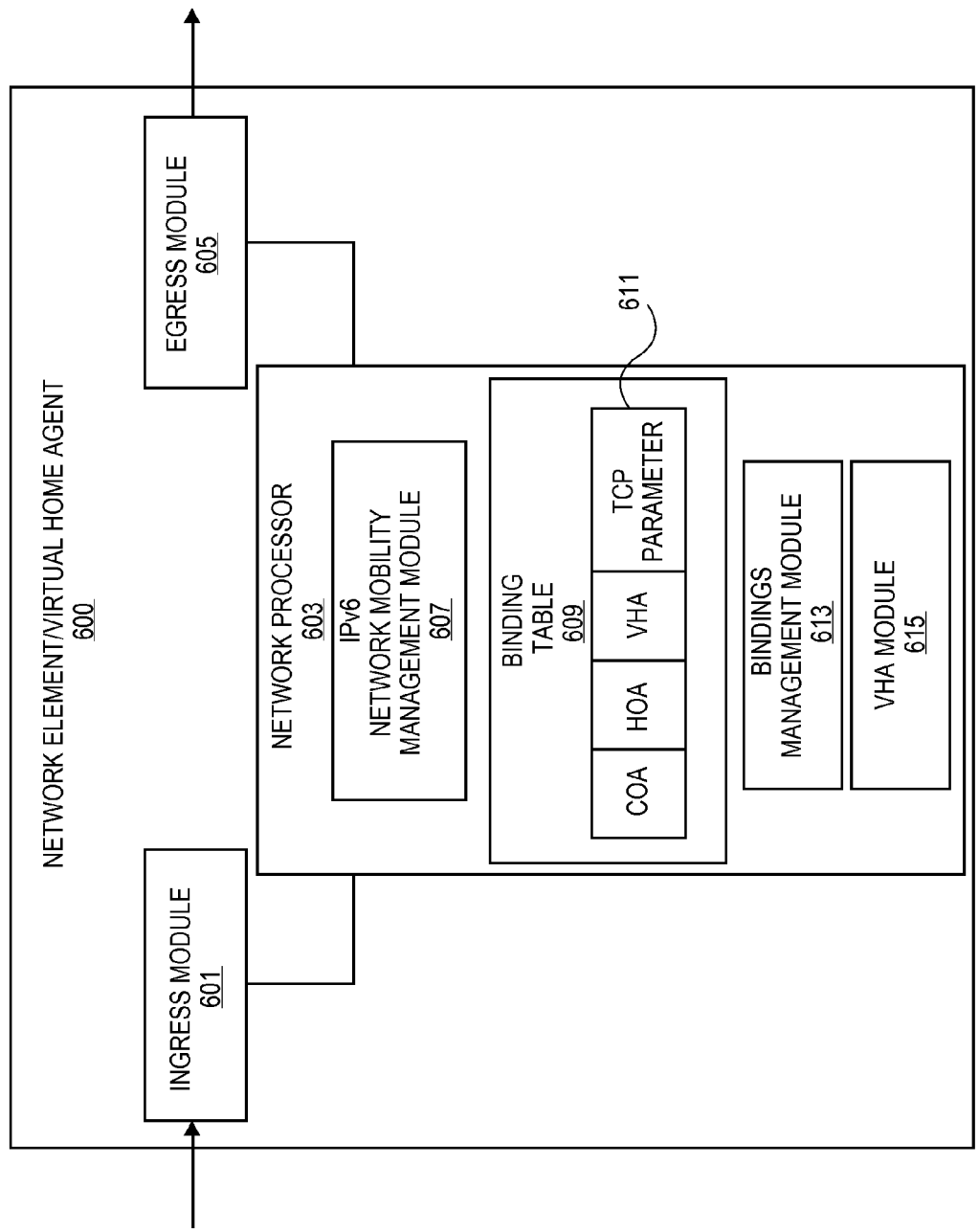

SYSTEM AND METHOD FOR MOBILITY WITH A SPLIT HOME AGENT ARCHITECTURE USING MPTCP

The present application is a continuation of U.S. patent application Ser. No. 12/969,229 filed on Dec. 15, 2010 which claims priority from U.S. Provisional Patent Application No. 61/366,314, filed on Jul. 21, 2010 and also is cross referenced with the co-pending U.S. patent application Ser. No. 12/969,235 filed Dec. 15, 2010. The cross referenced application is incorporated herein by reference.

FIELD OF THE INVENTION

Background

The mobile Internet protocol version 6 (MIPv6) allows a mobile device to maintain a continuous connection with another device that supports mobile Internet protocol version 6. Two separate modes of communication are supported with MIPv6: bi-directional tunneling (BT) mode and route optimization (RO) mode. Mobile IPv6 utilizes a home agent node to manage the forwarding of data traffic to a mobile node when that mobile node is not present in a home network.

When a mobile node moves to a foreign network, the mobile node registers in that network and reports the registration back to the home agent node. The home agent node receives data traffic from the corresponding node and forwards the traffic to the mobile node in the foreign network using IP in IP tunneling in BT mode. In RO mode, the home agent facilitates the communication between the corresponding node and the mobile node such that the corresponding node is notified of the new location and the address of the mobile node in the foreign network allowing the corresponding node to directly communicate with the mobile node in the foreign network without interruption to the transmission control protocol (TCP) connections.

In mobile IPv6, the mobile node has a static home agent which serves as an anchor point to ensure a global and continuous reachability for the mobile node regardless of its current topological location (i.e., in the home network or attached to a foreign network). However, the cases where a failure of the home agent occurs or the home agent is overloaded are not solved by mobile IPv6. BT mode is secure and requires a significant amount of signaling messages to establish and maintain the tunnel between the mobile node and home agent. BT mode is also under the mobile node's control. In contrast, the RO mode requires the direct involvement of both the mobile node and corresponding node and requires that more resources be expended in the overhead mobility signaling to establish and maintain the RO mode in comparison with the BT mode.

SUMMARY

A method is implemented in a network element in a wide area network, where the network element functions as a control node for a mobile node (MN) communicating with a corresponding node (CN). The method includes selecting by the control node a virtual agent in the network to provide mobility services to the MN. The virtual agent represents a set of mobile resources proximate to the MN. The virtual agent is selected such that the MN receives a better quality of service when communicating with the CN through the virtual agent. A provisioning message is sent to the selected virtual agent, where the provisioning message includes parameters for a session between the MN and CN and the provisioning message includes a care-of address for the MN and an address of the CN. The provisioning message initiates a flow redirection at the virtual agent. A provisioning acknowledgement message is received from the virtual agent indicating that the virtual agent is receiving data packets from the CN and forwarding the data packets to the MN at the care-of address.

A method is implemented in a network element in a wide area network, where the network element functions as a virtual agent for a mobile node (MN) communicating with a corresponding node (CN). The method includes receiving a provisioning message from a control node including parameters for a session between the MN and CN. The provisioning message includes a care-of address of the MN and an address of the CN. A flow redirection is initiated with the CN to establish a flow between the MN and CN that passes through the virtual agent, such that the MN receives a better quality of service when communicating with the CN through the virtual agent. A provisioning acknowledgement message is sent to the control node upon establishment of the flow. Data packets of the flow are received at the virtual agent from the CN and the data packets are forwarded to the MN from the CN.

A network element is configured to function as a control node. The network element is configured to communicate with a mobile node (MN), a corresponding node (CN) and a plurality of virtual agents over a wide area network. The network element includes an egress module that is configured to receive data packets over the networks, an ingress module that is configured to transport the data packets over the network, and a network processor communicatively coupled to the ingress module and egress module. The network processor is configured to execute a network mobility management module, and a virtual agent module. The network mobility management module is configured to manage a communication session between the mobile node and the corresponding node, and the virtual agent management module is configured to select a virtual agent from the plurality of virtual agents to provide mobility services to the MN. The selection is based on pre-defined policies, where the virtual agent represents a set of mobile resources proximate to the MN. The virtual agent is selected to provide the MN with a better quality of service when communicating with the CN through the selected virtual agent. The virtual agent management module sends a provisioning message to the selected virtual agent. The provisioning message includes parameters of a session between the MN and the CN. The provisioning message causes the selected virtual agent to establish a flow between the MN and CN that passes through the selected virtual agent. The virtual agent management module receives a provisioning acknowledgement message from the selected virtual agent.

A network element is configured to function as a virtual agent. The network element is in communication with a mobile node (MN), a corresponding node (CN) and a control node over a wide area network. The network element includes an ingress module configured to receive data packets over the network, an egress module configured to transport the data packets over the network, and a network processor communicatively coupled to the ingress module and egress module. The network processor is configured to execute a network mobility management module and a virtual agent module. The network mobility management module is configured to manage a communication session between the MN and the CN, such that the MN receives a better quality of service when communicating with the CN through the selected virtual agent, and a virtual agent module provides a home agent service to the MN. The virtual agent module receives a provisioning request message from the control node that includes parameters of a session between the MN and CN, a care-of address of the MN, and an address for the CN. The virtual agent module is configured to establish a flow from the CN to the MN that passes through the virtual agent and to send a provisional acknowledgement message to the control node.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 6 is a diagram of one embodiment of a virtual home agent.

DETAILED DESCRIPTION

Figure 1:
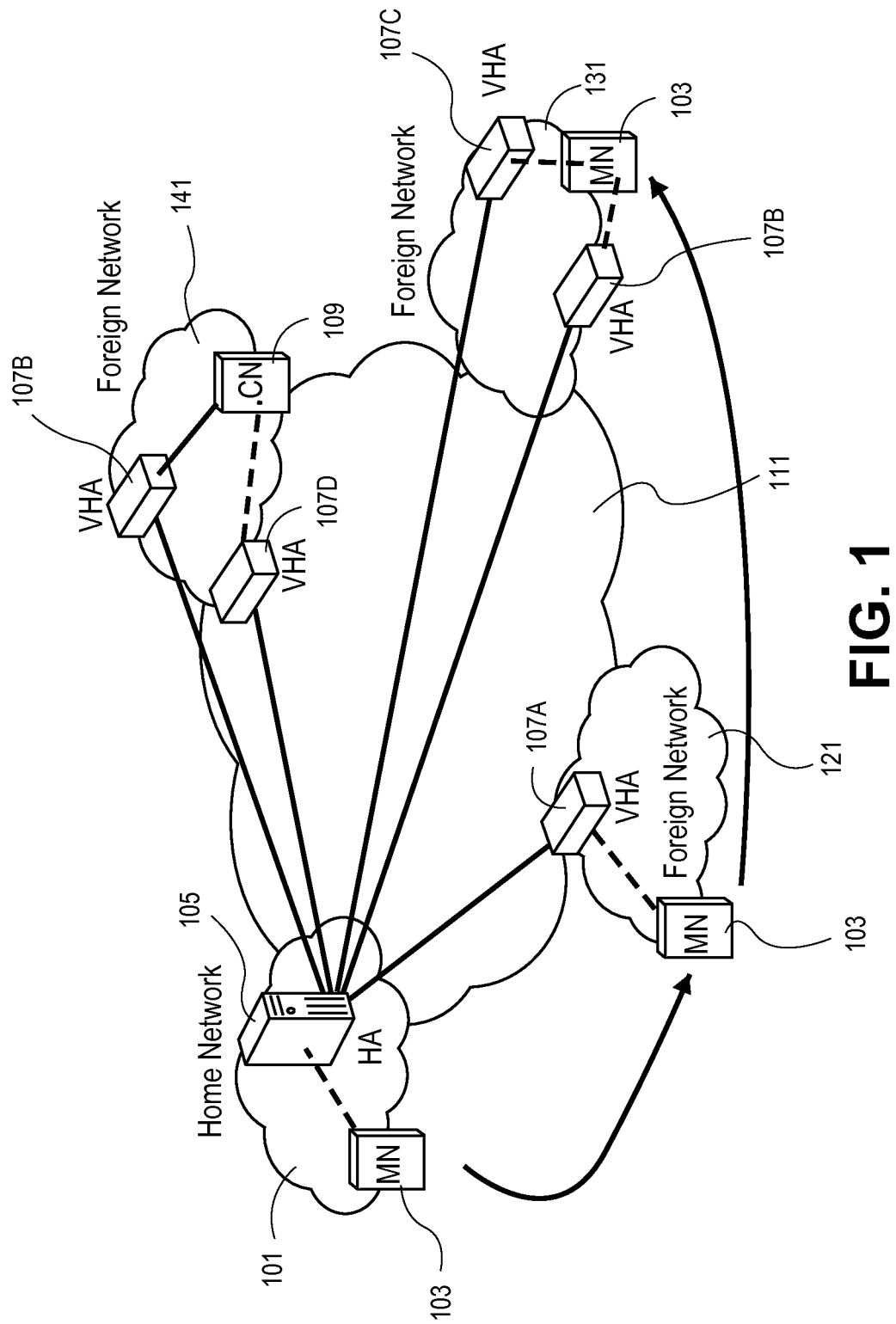
FIG. 1 is a diagram of one embodiment a network implementing the split home agent architecture.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1 and 4-6. However, it should be understood that the operations of the flow diagrams can be performed by embodiments of the invention other than those discussed with reference to FIGS. 1 and 4-6, and the embodiments discussed with reference to FIGS. 1 and 4-6 can perform operations different than those discussed with reference to the flow diagrams of FIGS. 2 and 3.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art include bi-directional tunneling (BT) mode not being optimal when the mobile node is far away from its home network. For example, if a mobile node is in the United States communicating with a corresponding node located in the United States while its home network is in Japan, then all traffic between the mobile node and corresponding node has to go to the home agent in Japan before coming back to the mobile node. The telecommunications landscape is going through a tremendous growth in the real time applications, services and web-enabled high definition television and these type of applications are expected not only to grow but to be also the main driver for telecommunication service operators revenues. Hence, ensuring a high Quality of Service to the customer is important in an increasingly competitive environment. Furthermore, these particular types of applications may lead to a "bottleneck" at the home agent level in which case, all clients will suffer a drop in the service quality.

The embodiments of the invention overcome these disadvantages of the prior art. Instead of deploying a cluster of home agents in a home network, a split control architecture is utilized whereby a central home agent connects to a set of new lightweight virtual home agents (VHAs), which don't deal directly with the mobile node, but are able to provide specific services as requested by the home agent and based on feedback from the mobile node. In addition, virtual home agents can be located anywhere and don't need to exchange direct signaling with the mobile node (i.e., mobility related signaling or other signaling). Instead, virtual home agents aim to offer particular home agent features for the mobile node without the knowledge of the mobile node. The home agent has a secure connection with each virtual home agent and is fully aware of each virtual home agent location.

The split home agent architecture and method is suitable for multi-homed mobile nodes. This means that a mobile node is expected to have at least two different interfaces (e.g., an interface with the line terminal equipment (LTE) and an interface with the (WLAN) in which case, both interfaces are connected to the same operator network (e.g., AT&T, Verizon, T-Mobile and similar operators). This split home agent based architecture provides a better mobility performance than the performance provided by the BT mode.

Consequently, the split home architecture can be described as having one centralized policy control node, which receives input from the mobile node, among others, and makes a decision accordingly. The centralized control node is executed by a home agent node that is connected to a large set of lightweight home agents which serve to create a sort of "location-based" virtual home agent but with no direct relationship with the mobile node. The mobile node updates its home agent with a new care-of address (CoA) and lets the home agent determine the right virtual home agent (in cases where one can be used).

The main benefits of having a virtual home agent are to optimize the data traffic routing, offer a better quality of service (QoS) and offload the services of the home agent whenever needed. Such optimization includes implementing the equivalent of a route optimization mode without requiring the two real endpoints (i.e., mobility node and corresponding node) to deal with each other in terms of exchanging mobility signaling protocols. The virtual home agents can be located anywhere and do not pose a scalability issue. In addition, the home agent can also move sessions from one virtual home agent (VHA) to another depending on the mobile node location so that the mobile node can always be assigned to the closest virtual home agent.

While the MIPv6 RO mode enables a data packet exchange on the direct path between the mobile node and the corresponding node. The split home agent architecture fits between the BT mode and the RO mode and is more beneficial and quicker to implement because it enables the operators to keep full control of the traffic flows while optimizing data packets routing.

FIG. 1 is a diagram of one embodiment of a network implementing the split home agent architecture. The network includes a mobile node 103, a home agent 105 located in the home network 101, a set of foreign networks 121, 131, 141 and a set of virtual home agents 107A-107E. The home network 101 and foreign networks 121, 131 and 141 can be connected by a core network 111. Each of these networks can be a local area network (LAN), a wide area network (WAN), such as the Internet, or a similar network. The mobile node 103 can be moved between any of the networks 101, 121, 131 and 141 and maintain a connection with a corresponding node over the network 111.

The mobile node 103, home agent node 105 and virtual home agents 107A-107E can be any type of computing devices or networking elements including laptop computers, routers, switchers, desktop computers, servers, handheld devices, console devices and similar computing and networking devices. The networks 101, 111, 121, 131 and 141 can include any combination of wired and wireless connections and any number of intermediate computers or networking devices.

In one embodiment, the mobile node 103 and home agent 105 implement the mobile Internet protocol version 6 (MIPv6) or similar communication protocol enabling the mobile node 103 to maintain connections (e.g., TCP connections) with corresponding nodes when moving between networks and when changing network connections. The virtual home agents 107A-107E are controlled by the home agent 105, which selects and directs the virtual home agents 107A-107E to perform home agent functionality thereby offloading these functions to the virtual home agents 107A-107E from the home agent 105 or sharing these functions with the virtual home agent 107A-107E in coordination with the home agent 105.

The use of these virtual home agents 107A-107E to provide any subset of the functionality of the home agent 105 is to improve the quality of service offered to the mobile node 103. By utilizing a virtual home agent 107A-107E in place of the home agent 105, the virtual home agent 107A-107E can have a greater proximity to the mobile node 103. As a result, a higher quality of service can be offered to the mobile node 103 in cases where the home agent 105 is not as close to the mobile node and corresponding node 109 as a virtual home agent 107A-107E. Improved quality of service can include increased bandwidth, lower latency and similar improved communication metrics between the mobile node 103 and the corresponding node 109 using the virtual home agent 107A-107E in comparison to using the home agent 105.

The mobile node 103 can be connected to a home agent 105 regardless of the current network that a mobile node 103 is connected to in order to keep the home agent 105 up to date on the current location of the mobile nodes 103 so that the home agent 105 can determine which virtual home agent 107A-107E should be utilized to provide home agent services to the mobile node 103. At any given time, the mobile node 103 can be connected to multiple virtual home agents 107A-107E in addition to being connected to the home agent 105. Each network can include a NAT66 to perform network address translation such that data packets destined for the mobile node 103 can be properly translated to its local address in the foreign network 121 and 141. Each virtual home agent 107A-107E can also have a secure connection to the home agent 105 to receive communication and direction from the home agent 105 as well as to keep the home agent 105 informed of its status and location.

Figure 2:
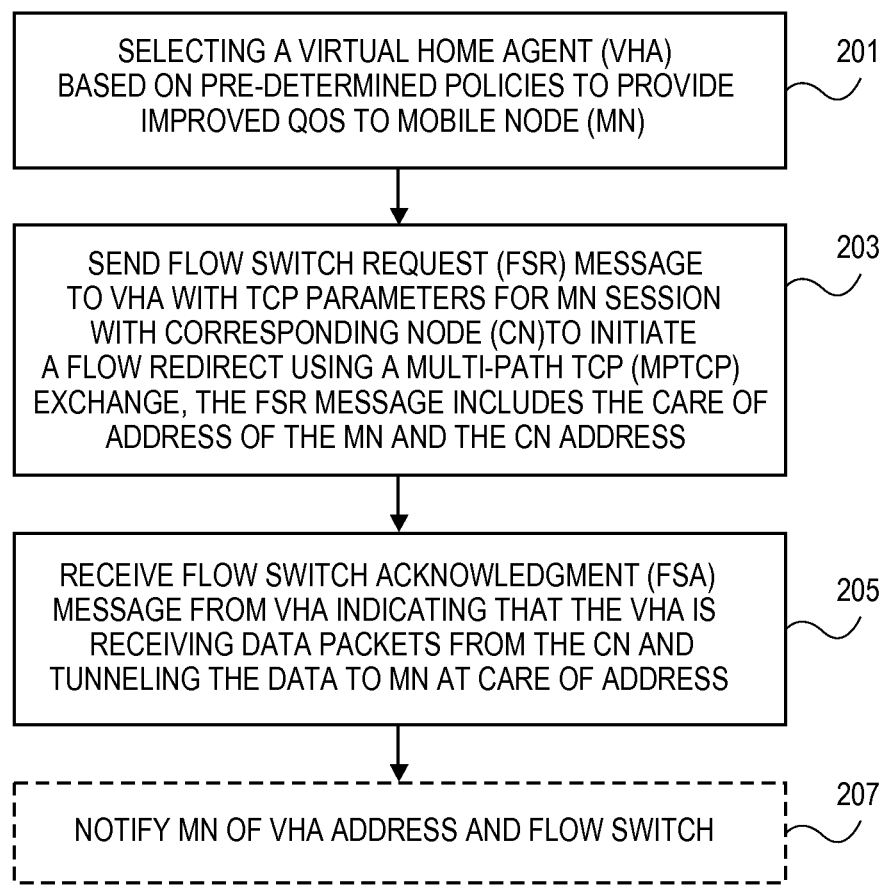
FIG. 2 is a flowchart of one embodiment of a process for configuring a virtual home agent performed by the home agent.

FIG. 2 is a flowchart of one embodiment of the process performed by the home agent for configuring a virtual home agent. In one embodiment, the process is triggered in response to a home agent receiving a binding update message from a mobile node indicating that the mobile is connected to a new or different foreign network. The home agent then can analyze the location of the mobile node to determine whether or not a virtual home agent can provide home agent services to the mobile node with an improved quality of service (Block 201). The analysis can include an application of predetermined policies including a comparison of address prefixes, quality of service metrics, location or topology information and similar information maintained by the home agent to determine whether each available virtual home agent would provide a higher level or an improved quality of service. The home agent may select a single virtual home agent or a set of virtual home agents to delegate or assign home agent services.

After selecting a virtual home agent, the home agent sends a flow switch request message to the selected virtual home agent with transmission control protocol (TCP) parameters for the session between the mobile node and the corresponding node (Block 203). The flow switch request message initiates a flow redirect using a multi-path TCP exchange. Multi-path TCP is an enhancement of TCP that enables the sending of a particular packet over a particular path. Standard TCP congestion control algorithms are run for each path such that each path has its own congestion window that reflects the available bandwidth for the path. Multi-path TCP can send many packets over paths with a large congestion window and/or a small round-trip-time (RTT) and fewer packets over paths that have a small window and/or a large RTT. This way, a multi-path TCP can automatically-and quickly-adjust to congestion in the network, moving traffic away from congested paths and toward uncongested paths. In this case, the flow switch request initiates the creation of new multi-path TCP paths that traverse the virtual home agent.

The flow switch request message also includes a care-of address of a mobile node and a corresponding node address. Multi-path TCP enables the setting up of multiple sub-flows between two nodes. A flow is a stream of TCP packets sent between two nodes. A sub-flow is a sub-set of the stream of TCP packets from the flow sent over a particular path that is started and terminated similar to a regular TCP connection. Sub-flows are terminated as regular TCP connections. In other words, a multi-path TCP connection is a set of one or more sub-flows that are combined to provide a single multi-path TCP service to an application at a host. Multi-path TCP utilized in this context sets up a new flow or sub-flow between the mobile node and the corresponding node that passes through the virtual home agent instead of the home agent.

After sending the flow switch request message the home agent expects and receives the flow switch acknowledgement message from the virtual home agent indicating that the virtual home agent is receiving data packets from the corresponding node over a newly established multi-path TCP connection and is tunneling the data received from the corresponding node to the mobile node at its care-of address (Block 205).

In one embodiment, in response to receiving the flow switch acknowledgment message the home agent notifies the mobile node of the address of the virtual home agent that implements the flow switch (Block 207). In other embodiments, the home agent can notify the mobile node of the virtual home agent address in a binding acknowledgement message, which is returned to the mobile node in response to receiving the binding update message. Other information about the virtual home agent or new TCP flow can also be provided including TCP parameters for the new TCP flow. In other embodiments, the mobile node is unaware of the virtual home agent. The mobile node may tunnel data traffic to the virtual home agent, but is unaware that the virtual home agent is servicing the tunnel instead of the home agent. In addition, other home agent services can also be delegated or assigned to the virtual home agent.

Figure 3:
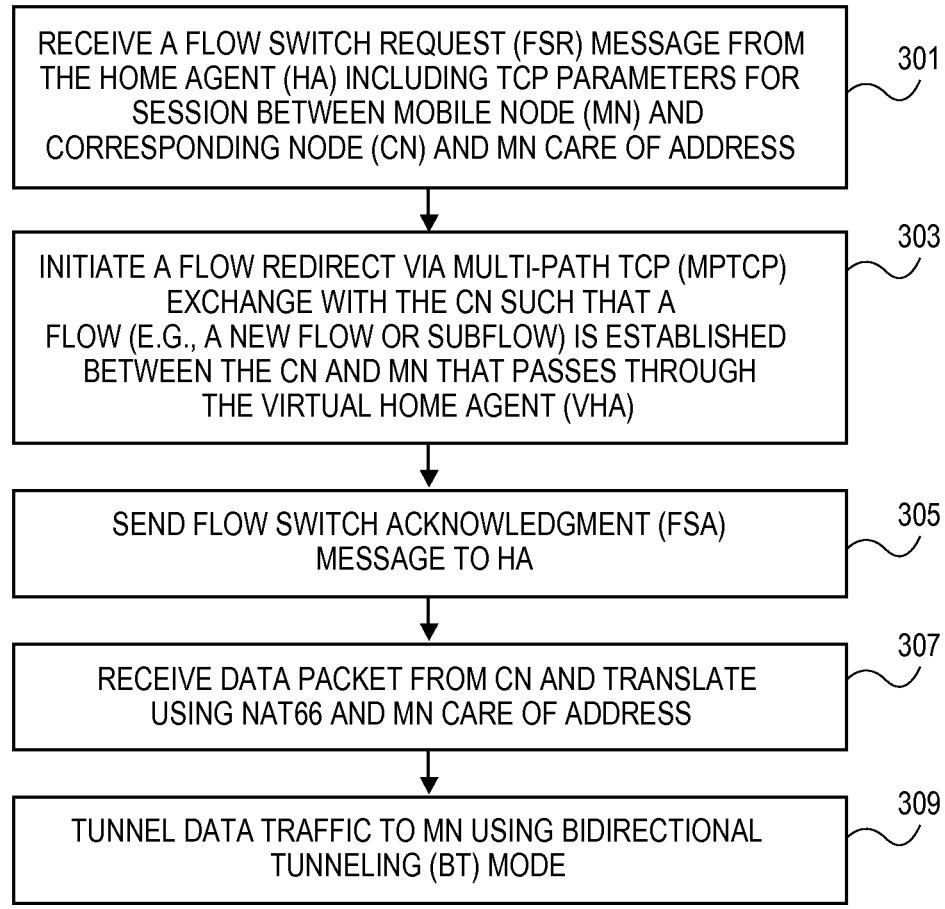
FIG. 3 is a flowchart of one embodiment of the process of configuring a virtual home agent performed by the virtual home agent.

FIG. 3 is a flowchart of one embodiment of a process for configuring a virtual home agent performed by the virtual home agent. In one embodiment, this process is initiated by the receipt at the virtual home agent of a flow switch request message from the home agent (Block 301). In response to receiving the flow switch request message, the virtual home agent can request an establishment of a new flow or sub-flow of the TCP session between the corresponding node and the mobile node, where the new flow or sub-flow passes through the virtual home agent. The new flow or sub-flow can be established using multi-path TCP exchange and through the use of the supplied TCP parameters of the existing TCP session between the mobile node and the corresponding node as well as the care-of address of the mobile node received in the flow switch request message.

Establishing the new flow or sub-flow redirects data packets from the corresponding node to the virtual home agent. Upon completion of the flow redirection using multi-path TCP exchange, the virtual home agent sends a flow switch acknowledgement message to the home agent (Block 305). Sending the flow switch acknowledgement message indicates that the establishment of the new flow or sub-flow multi-path TCP exchange has been successful and that data is now being received by the virtual home agent from the corresponding node, which in turn is being tunneled to the mobile node.

When data traffic is received from the corresponding node at the virtual home agent, the virtual home agent utilizes a Network Address Translation (NAT66) to translate the incoming data such that it can be tunneled to the mobile node care-of address (block 307). The virtual home agent then tunnels data traffic from the corresponding node to the mobile node using a bi-directional tunneling mode (block 309). The mobile node implements mobile Internet protocol version 6 (MIPv6) and thus is capable of receiving a bi-directional tunnel as though it is coming from the home agent. In some embodiments, data traffic is received from the mobile node at the virtual home agent over the bi-directional tunnel and forwarded to the corresponding node.

Figure 4:
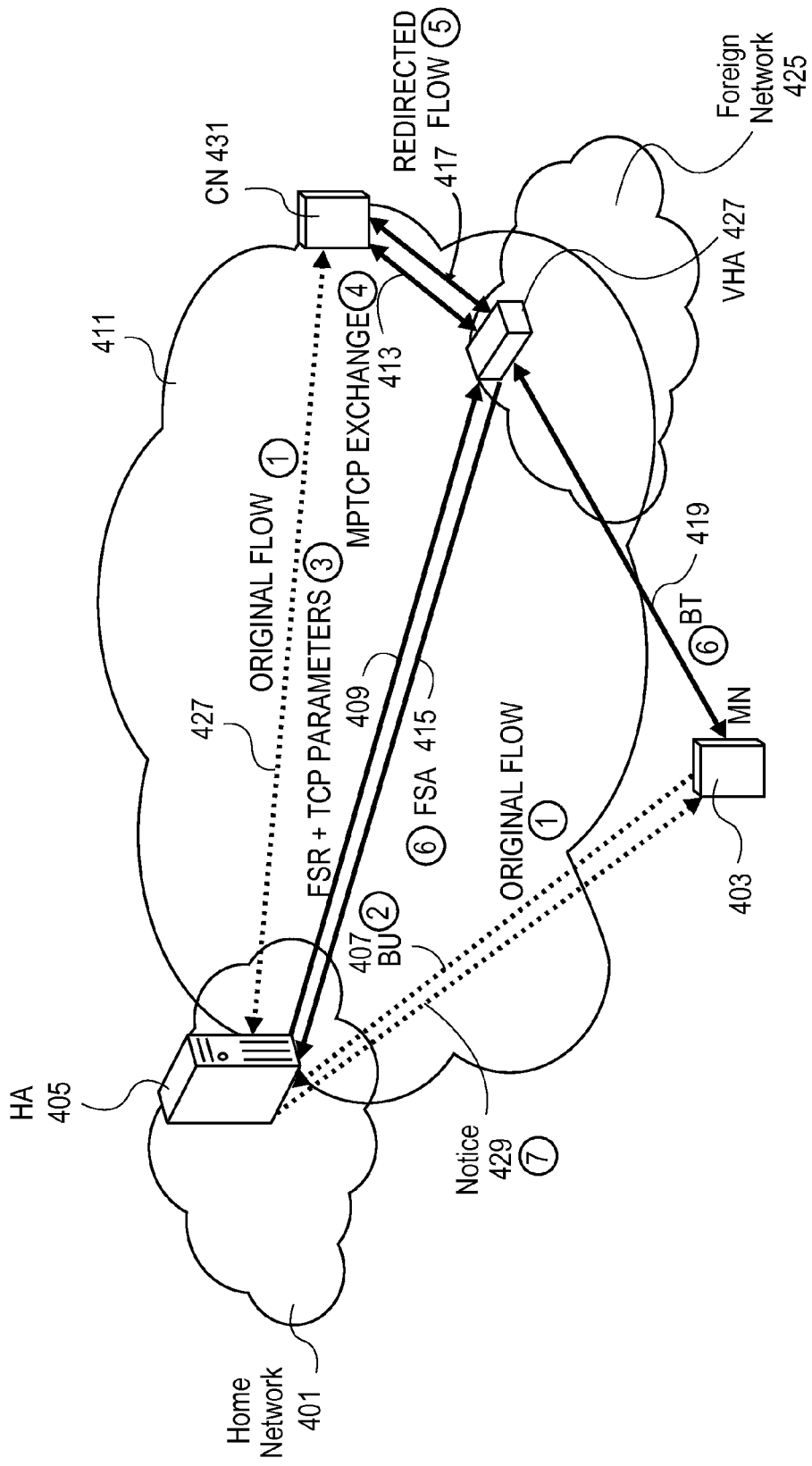
FIG. 4 is a diagram of one embodiment of the split home architecture messaging.

FIG. 4 is a diagram of one embodiment of a system architecture showing the exchange of messages in the split home architecture. In the example architecture, an existing or original flow (1) exists between the corresponding node 431 and mobile node 403 that passes through the home agent 405. Subsequently, the mobile node 403 sends (2) a binding update message 407 to the home agent 405 indicating the connection of the mobile node 403 to a new network such as a foreign network 425. The home agent 405 in home network 401 determines whether or not a virtual home agent 427 can provide a better quality of service to the mobile node 403.

Upon selection of a virtual home agent 427 the home agent 403 generates and sends (3) a flow switch request message 409 including the TCP parameters of the communication between the mobile node 403 and the corresponding node 431. The virtual home agent 427 receives the flow switch request messaging 409 and TCP parameters and initiates (4) a new flow or sub-flow between the corresponding node 431 and mobile node 403 using multi-path TCP exchange 413 with the corresponding node 431 whereby the communication between the mobile node 403 and the corresponding node 431 that currently passes through the home agent 405 is either redirected or included in a secondary sub-flow (5) through the virtual home agent 427. The redirected flow 417 passes through the virtual home agent 427 in foreign network 425 and then is tunneled to the mobile node 403 using bi-directional tunneling 419. After the flow has been redirected and the tunnel between the mobile node 403 and virtual home agent 427 has been established, the virtual home agent 427 notifies (6) the home agent 405 with the flow switch acknowledgement message 415.

In one embodiment, the home agent 405 residing in the home network 401 notifies (7) the mobile node 403 of the address and similar information about virtual home agent 427. This can also be accomplished through a binding acknowledgement message in response to receiving the binding update message 407. However, in other embodiments, this notification is not provided and the mobile node 403 is unaware of the existence of the virtual home agent 427. Rather, the mobile node 403 assumes the bi-directional tunnel is serviced by the home agent 405.

Figure 5:
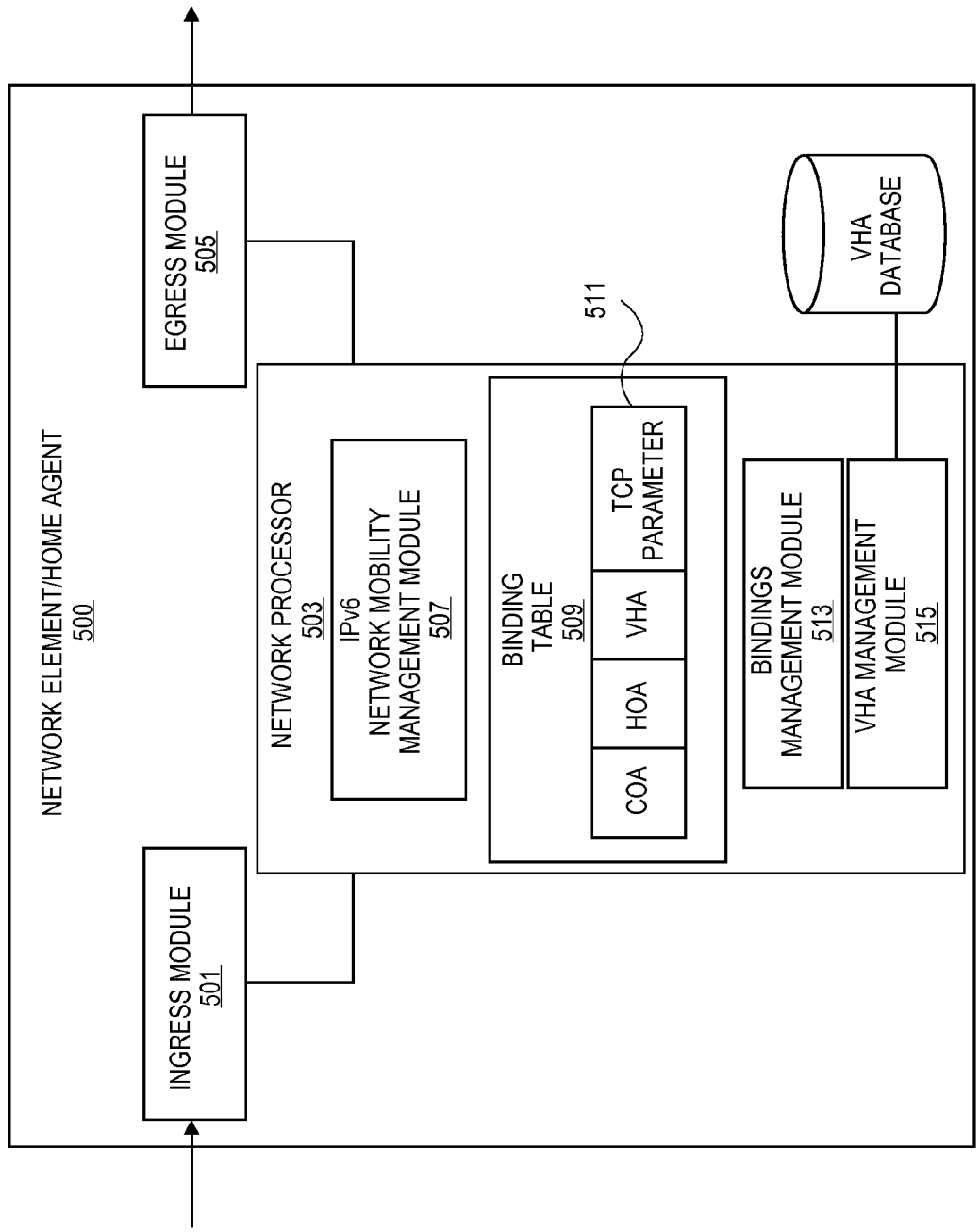
FIG. 5 is a diagram of one embodiment of a home agent.

FIG. 5 is a diagram of one embodiment of a network element serving as the home agent node. The network element 500 can include an ingress module 501, an egress module 505 and a network processor 503. The ingress module 501 can handle the processing of data packets being received by the network element at the physical link and data link level. The egress module 505 handles the processing and data packets being transmitted by the network element at the physical link and data link level. The network processor 503 handles the routing, forwarding and higher level processing of the data traffic. The network processor 503 can execute or include an IPv6 network mobility management module 507, bindings table 509, bindings management module 513 and a virtual home agent management module 515.

The network mobility management module 507 receives data traffic from the mobile node and forwards that data traffic to a corresponding node when a virtual home agent has not been assigned. The mobility management module implements the basic mobile IPv6 functionality including supporting BT modes, multi-path TCP, tunneling and address translation. The network mobility management module 503 also receives data traffic from the corresponding node and forwards it to the mobile node. Any combination of these functions can be delegated to a virtual home agent.

The bindings management module 513 receives binding update messages from the mobile node when the mobile node connects to foreign networks. Each of the binding update messages includes an IPv6 care-of address assigned by the foreign network to which the mobile node is currently connecting. The bindings management module 213 is further configured to send a binding request message, responsive to each of the binding update messages that is received, to the home NAT node to bind the mobile node's home address with a prefix of a foreign NAT node in that foreign network at the home NAT node.

The bindings management module 513 also receives binding update messages or requests from the virtual home agent (VHA) management module 515. The bindings management module 513 updates and maintains binding entries 511 in the binding table 509. These binding entries 501 correlate the care-of address (COA), home agent address (HOA), virtual home agent address (VHA), corresponding node address (CN), TCP parameters and similar data to be used for forwarding data traffic between a mobile node and corresponding node as well as tracking the delegation of home agent services to a virtual home agent.

A virtual home agent (VHA) management module 515 selects a virtual home agent and performs the transfer of home agent services as described above in regard to FIG. 2. A virtual home agent database 521 or similar storage system or data structure tracks the properties, topology and similar virtual home agent information needed to select and transfer services to the available virtual home agents. The virtual home agent database can also be utilized to track the assignment of home agent services to each virtual home agent.

FIG. 6 is a diagram of one embodiment of a virtual home agent. The network element 600 can include an ingress module 601, an egress module 605 and a network processor 603. The ingress module 601 can handle the processing of data packets being received by the network element at the physical link and data link level. The egress module 605 handles the processing and data packets being transmitted by the network element at the physical link and data link level. The network processor 603 handles the routing, forwarding and higher level processing of the data traffic. The network processor 603 can execute or include an IPv6 network mobility management module 607, bindings table 609, bindings management module 613 and a virtual home agent module 615.

The network mobility management module 607 receives data traffic from the mobile node and forwards that data traffic to a corresponding node when a virtual home agent has not been assigned. The mobility management module implements the basic mobile IPv6 functionality including supporting BT, multi-path TCP, tunneling and address translation. The network mobility management module 603 also receives data traffic from the corresponding node and forwards it to the mobile node.

The bindings management module 613 receives binding update messages or requests from the virtual home agent module 615. The binding management module 613 updates and maintains binding entries 611 in the binding table 609. These binding entries correlate the care-of address (COA), home agent address (HOA), virtual home agent address (VHA), corresponding node address (CN), TCP Parameters and similar data to be used for forwarding data traffic between a mobile node and corresponding node as well as tracking the home agent services to be performed for each mobile node or home agent node.

A virtual home agent (VHA) module 615 receives requests from home agents to transfer home agent services to the virtual home agent as described above in regard to FIG. 3. The virtual home agent module 615 process flow switch requests messages from the home agent and redirects data traffic from the corresponding node to the virtual home agent using MPTCP exchange to establish a new flow or sub-flow for the session between the mobile node and corresponding node. The new flow or sub-flow passes through the virtual home agent. The virtual home agent module and network mobility management module can tunnel and forward data traffic between the mobile node and corresponding node as set forth above in regard to FIGS. 2 and 3.

Thus, a method, system and apparatus for enabling a split home agent architecture has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a network element in a wide area network, the network element functioning as a control node for a mobile node (MN) communicating with a corresponding node (CN), the method comprising the steps of:

selecting by the control node a virtual agent in the network to provide mobility services to the MN, the virtual agent representing a set of mobile resources proximate to the MN, the virtual agent selected such that the MN receives a better quality of service when communicating with the CN through the virtual agent;

sending a provisioning message to the selected virtual agent, the provisioning message including parameters for a session between the MN and CN and the provisioning message including a care-of address for the MN and an address of the CN, the provisioning message to initiate a flow redirection at the virtual agent; and receiving a provisioning acknowledgement message from the virtual agent indicating that the virtual agent is receiving data packets from the CN and forwarding the data packets to the MN at the care-of address.

2. The method of claim 1, wherein the set of mobile resources include operator network resources.

3. The method of claim 1, wherein the virtual agent selection is based on predefined policies including one or more of a comparison of the care-of address of the MN with each address of a plurality of virtual agents including said virtual agent, the use of topological information, quality of service requirements, bandwidth metrics and latency metrics.

4. A method implemented in a network element in a wide area network, the network element functioning as a virtual agent for a mobile node (MN) communicating with a corresponding node (CN), the method comprising the steps of:
receiving a provisioning message from a control node including parameters for a session between the MN and CN, the provisioning message including a care-of address of the MN and an address of the CN;
initiating a flow redirection with the CN to establish a flow between the MN and CN that passes through the virtual agent, such that the MN receives a better quality of service when communicating with the CN through the virtual agent;
sending a provisioning acknowledgement message to the control node upon establishment of the flow;
receiving data packets of the flow at the virtual agent from the CN; and
forwarding the data packets to the MN from the CN.

5. The method of claim 4, wherein the virtual agent represents a set of mobile resources that include operator network resources.

6. A network element configured to function as a control node, the network element configured to communicate with a mobile node (MN), a corresponding node (CN) and a plurality of virtual agents over a wide area network, the network element comprising:
an egress module configured to receive data packets over the network;
an ingress module configured to transport the data packets over the network; and
a network processor communicatively coupled to the ingress module and egress module, the network processor configured to execute a network mobility management module, and a virtual agent module,
the network mobility management module configured to manage a communication session between the mobile node and the corresponding node, and
the virtual agent management module configured to select a virtual agent from the plurality of virtual agents to provide mobility services to the MN, the selection based on pre-defined policies, the virtual agent representing a set of mobile resources proximate to the MN, the virtual agent selected to provide the MN with a better quality of service when communicating with the CN through the selected virtual agent, the virtual agent management module to send a provisioning message to the selected virtual agent, the provisioning message including parameters of a session between the MN and the CN, the provisioning message to cause the selected virtual agent to establish a flow between the MN and CN that passes through the selected virtual agent, the virtual agent management module to receive a provisioning acknowledgement message from the selected virtual agent.

7. The network element of claim 6, further comprising:
a virtual agent database to store information about location or topology of the plurality of virtual agents.

8. The network of claim 6, wherein the pre-defined policies include one or more of a comparison of the care-of address of the MN with an address of each of the plurality of virtual agents, the use of topological information, quality of service requirements, bandwidth metrics and latency metrics.

9. The network element of claim 6, wherein the virtual agent management module is configured to notify the mobile node of the selected virtual agent.

10. A network element configured to function as a virtual agent selected by a control node, the network element in communication with a mobile node (MN), a corresponding node (CN) and the control node over a wide area network, the network element comprising:
an ingress module configured to receive data packets over the network;
an egress module configured to transport the data packets over the network; and
a network processor communicatively coupled to the ingress module and egress module, the network processor configured to execute a network mobility management module and a virtual agent module,
the network mobility management module configured to manage a communication session between the MN and the CN, such that the MN receives a better quality of service when communicating with the CN through the virtual agent, and
the virtual agent module to provide a home agent service to the MN, the virtual agent module to receive a provisioning request message from the control node including parameters of a session between the MN and CN, a care-of address of the MN, and an address for the CN, the virtual agent module configured to establish a flow from the CN to the MN that passes through the virtual agent and to send a provisional acknowledgement message to the control node.

11. The network element of claim 10, wherein the virtual agent module and network module management module tunnel data from the CN to the MN using Internet protocol in Internet protocol tunneling.

12. The network element of claim 10, wherein the virtual agent module and network mobility management module receive data packets from the MN and forward the data packets to the CN.

* * * * *

UNITED STATES PATENT AND TRADEMARK OFFICE
CERTIFICATE OF CORRECTION

PATENT NO.        : 8,811,329 B2                                    Page 1 of 1
APPLICATION NO.   : 13/847979
DATED             : August 19, 2014
INVENTOR(S)       : Haddad It is certified that error appears in the above-identified patent and that said Letters Patent is hereby corrected as shown below:

On Title Page 2, item (74), under "Attorney, Agent, or Firm", in Column 2, Line 1, delete "Blakey," and insert -- Blakely, --, therefor.

In the Specification,

In Column 9, Line 26, delete "module 503" and insert -- module 507 --, therefor.

In Column 9, Line 45, delete "binding entries 501" and insert -- binding entries 511 --, therefor.

In Column 10, Line 13, delete "module 603" and insert -- module 607 --, therefor.

In the Claims,

In Column 12, Line 12, in Claim 8, delete "network" and insert -- network element --, therefor.

Signed and Sealed this
Eighteenth Day of August, 2015

Michelle K. Lee
*Director of the United States Patent and Trademark Office*